3,252,913
METHOD FOR PREPARING MANGANESE-ZINC-FERROUS FERRITE
Cornelis Leonardus Maria Van Gils, Theodorus Gerhardus Wilhelmus Stijntjes, and Johannes Gerardina Wilhelmus van de Waterbeemd, all of Emmasingel, Eindhoven, Netherlands, assignors to North American Philips Company, Inc., New York, N.Y., a corporation of Delaware
No Drawing. Filed Mar. 21, 1963, Ser. No. 266,806
Claims priority, application Netherlands, Mar. 26, 1962, 276,431
5 Claims. (Cl. 252—62.5)

Our invention relates to manganese-zinc-ferrous ferrite and in particular to a method of making manganese-zinc-ferrous ferrite having improved properties.

Manganese-zinc-ferrous ferrite, and a method of making it is described in U.S. Patent 2,636,860. This ferrite is frequently used for high-frequency applications where it must meet stringent requirements such as, quality factor (Q), initial permeability ($\mu_0$), and the temperature dependence of initial permeability.

It is a principal object of our invention to provide a method of manufacturing a manganese-zinc-ferrous ferrite having improved properties, particularly for use at high-frequencies.

It is a further object of our invention to provide a method of manufacturing a manganese-zinc-ferrous ferrite having a high initial permeability.

A still further object of our invention is to provide a method of manufacturing a manganese-zinc-ferrous ferrite having an extremely small temperature dependence of initial permeability.

These and further objects of the invention will appear as the specification progresses.

In accordance with the invention, a manganese-zinc-ferrous ferrite is prepared by mixing oxides of manganese, zinc, and iron in proportions which upon subsequent heating form a manganese-zinc-ferrous ferrite and heating this mixture under conditions specified with greater particularity hereinbelow. More particularly, we have found that if the following steps are followed in the sequence specified below, a product is obtained which is superior to known manganese-zinc-ferrous ferrites.

Thus, we have found that the following steps, if followed in the sequence in which they are enumerated, result in a superior product:

(a) The oxide mixture, which may be presintered, finely-divided, and compressed into a body of given shape and dimensions, should be sintered in an atmosphere, at least 99% by volume of which consists of oxygen, at a maximum temperature of between 1375° C. and 1450° C. for a period of time varying between 5 minutes and 4 hours.

(b) Following step (a) the temperature should be reduced to between 1250° C. and 1350° C.

(c) When the temperature level specified in (b) is reached, the oxygen content of the atmosphere should be reduced to between 0.1 and 0.5% by volume.

(d) The temperature should be maintained between 1250° C. and 1350° C. for at least 30 minutes.

(e) Not earlier than 15 minutes prior to the instant at which further cooling of the body is started, and at the latest at the instant further cooling is started, the oxygen content of the atmosphere should be decreased so that when a temperature of 900° C. is reached, the oxygen content of the atmosphere should not exceed 0.01% by volume.

We have further found that the highest value of initial permeability is achieved if the oxygen content of the atmosphere in the last step is decreased at the instant further cooling is started. If the reduction of the oxygen content is started somewhat earlier, the initial permeability will be somewhat lower; however, the temperature dependence of the initial permeability will be extremely small.

For completeness sake, it is already generally known, compounds which decompose upon heating to form corresponding oxides may be substituted for oxides in forming the initial mixture.

In a preferred embodiment of the invention, we form a mixture of about 26–30 mol. percent MnO, about 17–20 mol. percent ZnO, and about 52–55 mol. percent $Fe_2O_3$. This mixture is formed into a body which is heated in an atmosphere containing at least 99% by volume of oxygen at a temperature between 1410° C. and 1430 C. for several hours. The temperature is then reduced to a temperature between 1270° C. and 1290° C., the oxygen content of the atmosphere then being reduced to between 0.1% and 0.3% by volume. The body is maintained at the latter temperature for about 2½ hours, and then cooled and the oxygen content of the atmosphere reduced to less than 0.01%.

The following examples are considered illustrative of the invention which is not limited thereby, the invention being limited only by the claims.

*Example 1*

A finely divided mixture of 548 gms. of iron oxide, $Fe_2O_3$, 227 gms. of manganese carbonate, $MnCO_3$ and 93 gms. of zinc oxide, ZnO, was presintered by heating it at a temperature of 900–1000° C. for 60 minutes. The cooled presintered product was pulverized, mixed with a binder, granulated, and compressed to rings, under a pressure of 0.5 ton/cm.$^2$, having an outside diameter of 7.5 mms., an inside diameter of 5.0 mms. and a height of 3.0 mms. These rings were transferred to a gas-tight furnace. The temperature in the furnace in which a gas atmosphere prevailed consisting of substantially pure oxygen was increased to a maximum of 1420° C. in a period of time of from 5 to 6 hours. The temperature in the furnace was then decreased to 1270° C. and oxygen was replaced for by far the greater part by nitrogen at the same temperature, so that the oxygen content of the gas atmosphere in the furnace still was only 0.2% by volume. The temperature in the furnace was maintained at the above level of 1270° C. for another 3 hours. Then the temperature was decreased to ambient temperature in a period of time of 15 hours. At the instant at which the decrease of the temperature was started, the oxygen content of the gas atmosphere in the furnace also was further reduced. The reduction of the oxygen content of this atmosphere was carried out in a manner such that it amounted to less than 0.01% by volume when the temperature in the furnace has decreased to 900° C. The characteristics which are most important as a measure of the suitability of the resulting ferrite rings for use in high-frequency applications appeared to have the following values:

Quality factor, Q (at 4 kc./s. and at room temperature) _____ 230
Quality factor, Q (at 100 kc./s. and at room temperature) _____ 23
Initial permeability, $\mu_0$ (at room temperature) ____ 6300
Temperature factor of the initial permeability $1/\mu_0^2 \cdot \Delta\mu_0/\Delta T$ in the temperature range of from +20° C. to +70° C. _____ $+0.8 \times 10^{-6}$

*Example 2*

The method as described in Example 1 was substantially followed with this difference that fifteen minutes before the decrease of the temperature in the furnace from the level of 1270° C. on was started, the reduction of the oxygen content of the atmosphere below a value of 0.2% by volume had already started. The reduction of the oxygen content of the gas atmosphere in this case also was carried out so that this amounted to less than 0.01% by volume when the temperature in the furnace had fallen to 900° C.

The ferrite rings thus obtained appeared to have the following properties:

Quality factor, Q (at 4 kc./s. and at room temperature) _____ 160
Quality factor, Q (at 100 kc./s. and at room temperature) _____ 23
Initial permeability, $\mu_0$ (at room temperature) ____ 5400
Temperature factor of the initial permeability $1/\mu_0^2 \cdot \Delta\mu_0/\Delta T$ in the temperature range of from +20° C. to +70° C. _____ $+0.4 \times 10^{-6}$ While we have described our invention with reference to specific examples and application thereof, other modifications will be readily appearent to those skilled in this art without departing from the spirit and scope of the invention.

What we claim is:

1. A method of manufacturing a manganese-zinc-ferrous ferrite comprising the steps, forming a mixture of oxides of manganese, zinc and iron in proportions forming a manganese-zinc-ferrous ferrite upon heating, heating said mixture in an atmosphere containing at least 99% by volume of oxygen at a temperature of about 1375° C. to 1450° C. for a sufficient time to form a manganese-zinc-ferrous ferrite, then decreasing the temperature to between 1250° C. and 1350° C., reducing the oxygen content of the atmosphere to between 0.1 and 0.5% by volume, maintaining the ferrite at said latter temperature for at least 30 minutes, thereafter cooling said ferrite to a temperature of 900° C., reducing the oxygen content of said atmosphere to 0.01% by volume when said temperature reaches 900° C., the oxygen content being reduced commencing not more than 15 minutes prior to the start of the latter cooling step and not later than the instant said latter cooling commences, and cooling said ferrite from 900° C. to ambient temperature.

2. A method as claimed in claim 1 in which the mixture is constituted of about 26 to 30 mol percent of MnO, about 17 to 20 mol percent of ZnO, and 52 to 55 mol percent of $Fe_2O_3$.

3. A method as claimed in claim 2 in which the mixture is heated to a maximum temperature between 1410° C. and 1430° C.

4. A method as claimed in claim 3 in which after heating, the temperature is reduced to between 1270° C. and 1290° C. and the oxygen content of the atmosphere is reduced to between 0.1 and 0.3% by volume.

5. A method as claimed in claim 4 in which the ferrite is maintained at said latter temperature and in said atmosphere for 2½ to 3½ hours before further cooling and further reduction of the oxygen content of the atmosphere is commenced.

References Cited by the Examiner
UNITED STATES PATENTS

| | | | |
|---|---|---|---|
| 3,020,236 | 2/1962 | Sommer | 252—62.5 |
| 3,027,327 | 3/1962 | Blank | 252—62.5 |

TOBIAS E. LEVOW, *Primary Examiner.*

MAURICE A. BRINDISI, *Examiner.*

R. D. EDMONDS, *Assistant Examiner.*